United States Patent
Abraham

(10) Patent No.: US 10,068,218 B2
(45) Date of Patent: *Sep. 4, 2018

(54) INTELLIGENT POINT OF SALE SYSTEM

(71) Applicant: International Business Machines Corporation, Armonk, NY (US)

(72) Inventor: Subil M. Abraham, Plano, TX (US)

(73) Assignee: International Business Machines Corporation, Armonk, NY (US)

(*) Notice: Subject to any disclaimer, the term of this patent is extended or adjusted under 35 U.S.C. 154(b) by 888 days.

This patent is subject to a terminal disclaimer.

(21) Appl. No.: 14/087,213

(22) Filed: Nov. 22, 2013

(65) Prior Publication Data

US 2014/0081738 A1    Mar. 20, 2014

Related U.S. Application Data

(63) Continuation of application No. 13/587,513, filed on Aug. 16, 2012, now Pat. No. 8,856,034.

(51) Int. Cl.
| | |
|---|---|
| *G06Q 20/20* | (2012.01) |
| *G06Q 20/18* | (2012.01) |
| *G06Q 30/02* | (2012.01) |
| *G07G 1/14* | (2006.01) |
| *G06G 1/00* | (2006.01) |
| *G06G 3/00* | (2006.01) |

(52) U.S. Cl.
CPC .......... *G06Q 20/208* (2013.01); *G06Q 20/18* (2013.01); *G06Q 20/20* (2013.01); *G06Q 30/0238* (2013.01); *G07G 1/14* (2013.01)

(58) Field of Classification Search
CPC ....... A47F 9/046; A47F 9/047; G07G 1/0045; G07G 1/0036; G07G 1/14; G07G 3/00; G06Q 20/20; G06Q 20/202; G06Q 20/18; G06Q 20/208
See application file for complete search history.

(56) References Cited

U.S. PATENT DOCUMENTS

| | | |
|---|---|---|
| 6,497,362 B2 | 12/2002 | Persky et al. |
| 6,571,218 B1 | 5/2003 | Sadler |
| 6,672,506 B2 | 1/2004 | Swartz et al. |

(Continued)

FOREIGN PATENT DOCUMENTS

| | | |
|---|---|---|
| CN | 101201958 A | 6/2008 |
| CN | 101625785 A | 1/2010 |

(Continued)

OTHER PUBLICATIONS

"Allow Multiple Lanes to be Used for One Logical Transaction", [online] IP.com, No. IPCOM000206774D, May 6, 2011, retrieved from the Internet: <http://ip.com/IPCOM/000206774>.

(Continued)

*Primary Examiner* — Florian M Zeender
*Assistant Examiner* — Dana Amsdell
(74) *Attorney, Agent, or Firm* — Bryan D. Wells

(57) ABSTRACT

A customer can be recognized at a point-of-sale (POS) system. The customer can be recognized using a customer card or using image processing technology. The POS system is a self-service POS system. The scan rate for the customer can be compared with a minimum scan rate using a processor, and an action can be initiated responsive to the comparing.

19 Claims, 4 Drawing Sheets

(56) References Cited

U.S. PATENT DOCUMENTS

| | | |
|---|---|---|
| 6,854,656 B2 | 2/2005 | Matsumori |
| 7,136,623 B2 | 11/2006 | Fare et al. |
| 7,219,838 B2 * | 5/2007 | Brewster ................. A47F 9/045 |
| | | 235/382 |
| 7,280,800 B2 | 10/2007 | Morino |
| 7,376,583 B1 | 5/2008 | Rolf |
| 7,558,742 B2 | 7/2009 | Kloubakov et al. |
| 8,856,034 B2 | 10/2014 | Abraham |
| 2002/0103708 A1 | 8/2002 | Kloubakov et al. |
| 2002/0185532 A1 * | 12/2002 | Berquist .............. G06K 7/0008 |
| | | 235/385 |
| 2003/0018897 A1 * | 1/2003 | Bellis, Jr. ............. G06Q 20/341 |
| | | 713/182 |
| 2003/0217892 A1 * | 11/2003 | Persky .................... A47F 9/048 |
| | | 186/68 |
| 2005/0259797 A1 | 11/2005 | Swartz et al. |
| 2007/0084918 A1 * | 4/2007 | Tabet ...................... A47F 9/046 |
| | | 235/383 |
| 2007/0244760 A1 * | 10/2007 | Bodnar ................. G06Q 30/02 |
| | | 705/14.68 |
| 2012/0187184 A1 * | 7/2012 | Challa ............. G06K 19/06112 |
| | | 235/375 |
| 2012/0192276 A1 * | 7/2012 | Andrews ............... G06F 21/564 |
| | | 726/24 |
| 2012/0203647 A1 * | 8/2012 | Smith .................. G08B 13/246 |
| | | 705/23 |
| 2013/0103486 A1 * | 4/2013 | Hess ...................... G06Q 30/02 |
| | | 705/14.38 |

FOREIGN PATENT DOCUMENTS

| | | |
|---|---|---|
| CN | 103593926 B | 3/2017 |
| DE | 102013213841 A1 | 2/2014 |
| JP | 2004000018 A | 1/2004 |

OTHER PUBLICATIONS

"Automatic Checkout Lane Co-ordination: Balancing the Checkout Load between Lanes in Retail Stores"; [online] IP.com, No. IPCOM0002070365D, May 27, 2011, retrieved from the Internet: <http://priorartdatabase.com/IPCOM/000207365>.

U.S. Appl. No. 13/587,513, filed Aug. 16, 2012 Entitled "Intelligent Point of Sale System".

* cited by examiner

INTELLIGENT POINT OF SALE SYSTEM

CROSS REFERENCE TO RELATED APPLICATION

This application is a continuation of U.S. patent application Ser. No. 13/587,513 filed Aug. 16, 2012 the entire content and disclosure of which is incorporated herein by reference.

BACKGROUND

Self-service point-of-sale (POS) systems have become increasingly popular in many retail business establishments. Each year, a larger percentage of customers opt for self-service POS systems in lieu of using staffed, or full-service, POS systems. At each self-service POS system, customers typically scan items selected for purchase one-by-one as part of a transaction. The transaction generally ends upon successful payment by the customer.

BRIEF SUMMARY

One or more embodiments disclosed within this specification relate to point-of-sale (POS) systems and, more particularly, to intelligent POS systems.

An embodiment includes a method. The method includes detecting an error condition at a first point-of-sale (POS) system during a transaction for a customer. The first POS system is a self-service POS system. Responsive to the error condition, the transaction can be transferred to a second POS system using a processor without human intervention.

Another embodiment includes a method. The method includes recognizing a customer at a self-service POS system, comparing a scan rate for the customer with a minimum level of scan efficiency, and initiating an action responsive to the comparing.

Another embodiment includes a system. The system includes a processor configured to initiate executable operations. The executable operations include, detecting an error condition at a first POS system during a transaction for a customer, wherein the first POS system is a self-service POS system, and responsive to the error condition, transferring the transaction to a second POS system without human intervention.

Another embodiment includes a computer program product for processing transactions. The computer program product can include a computer readable storage medium having stored thereon program code that, when executed, configures a processor to perform executable operations. The executable operations include, detecting an error condition at a first POS system during a transaction for a customer, wherein the first POS system is a self-service POS system, and responsive to the error condition, transferring the transaction to a second POS system without human intervention.

DETAILED DESCRIPTION

Figure 1:
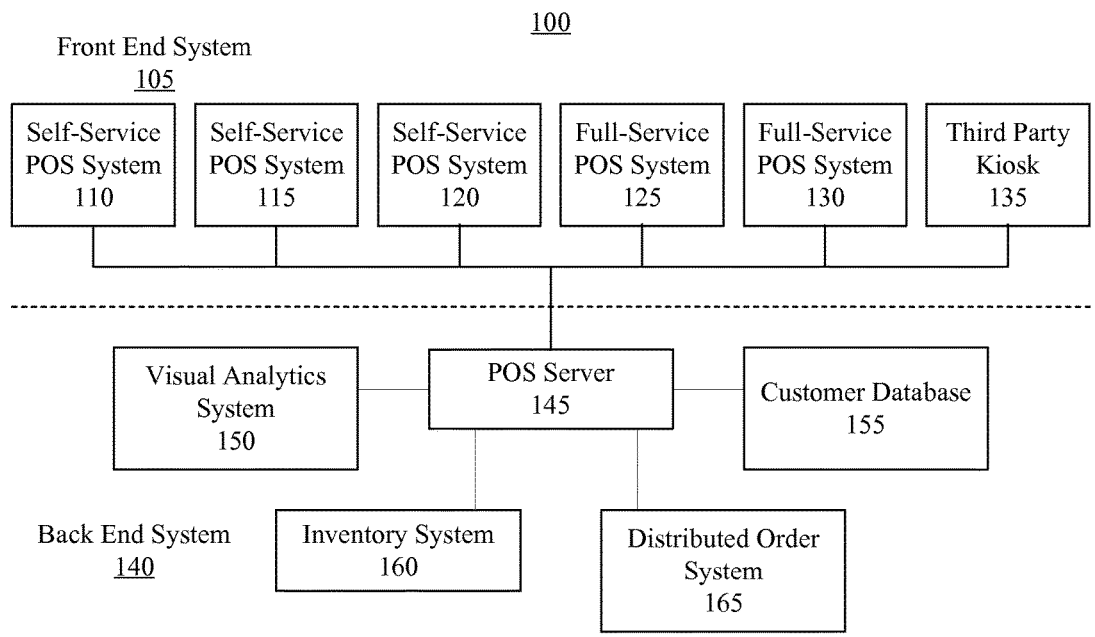
FIG. 1 is a block diagram illustrating an exemplary commerce system in accordance with an embodiment disclosed within this specification.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments relate to point-of-sale (POS) systems and, more particularly, to intelligent POS systems. In accordance with the inventive arrangements disclosed within this specification, a commerce system can include one or more POS systems including self-service POS systems. The POS systems can be communicatively linked with a POS server that performs various functions including, but not limited to, load balancing among POS systems, transferring a transactions from one POS system to one or more other POS systems, merging transactions from two or more POS systems, providing rewards to selected customers, monitoring the scanning efficiency of customers, and integrating with one or more other third-party kiosks located on premises with the POS systems.

FIG. 1 is a block diagram illustrating an exemplary commerce system 100 in accordance with an embodiment disclosed within this specification. Commerce system 100 can include a front end system 105 and a back end system 140. Front end system 105 includes one or more POS systems. As shown, front end system 105 includes one or more self-service POS systems 110, 115, and 120. Front end system 105 also can include one or more full-service POS systems 125 and 130. Optionally, front end system 105 includes one or more third-party kiosks 135.

The phrase "self-service POS system" refers to a POS system at which a customer, or user, performs much, if not all, of the tasks involved in a purchase transaction. The customer, for example, scans items selected for purchase as part of a transaction and provides payment to an automated payment processing system included within the self-service POS system to complete the transaction. A self-service POS system can be monitored by one or more agents (e.g., an employee, staff member, or the like) of an establishment in which the self-service POS system is installed or located. While the agent is available to aid a customer in the event of a problem, the agent is not generally responsible for scanning customer selected items or taking payment from the customer. To the extent an agent is available for a given self-service POS system, if at all, there are typically fewer agents than self-service POS systems.

By comparison, the phrase "full-service POS system" refers to a POS system that is staffed by an agent while the POS system is open and available for processing customer transactions. A one-to-one correspondence between agents and full-service POS systems that are open exists. The agent at each full-service POS system is responsible for scanning items selected by a customer for purchase and for taking payment or at least facilitating the payment process.

Each of POS systems 110-135 can be implemented as a data processing system and include, or be coupled to, peripheral devices such as an optical scanner and a payment processing system. POS systems 110-135 optionally can include, or be coupled to, one or more other peripheral devices such as a radio frequency identifier (RFID) scanner, a video camera, a still image camera, or the like.

The phrase "third-party kiosk" (hereinafter "kiosk") refers to a terminal located on premises of an entity in which POS systems 110-130 are located. Kiosk 135 is owned or managed by an entity other than the entity that owns or manages POS systems 110-130 or back end system 140.

Back end system 140 can include one or more other processing nodes and/or systems that support the various POS systems, but with which the customer does not have direct contact. As shown, each of self-service POS systems 110-120, full-service POS systems 125-130, and kiosk 135 is coupled to a POS server 145. POS systems 110-130 and kiosk 135 are coupled to POS server 145 through a network, whether wired or wireless. In one aspect, POS server 145 is implemented as a data processing system to be described in further detail within this specification. As such, POS server 145 communicates with each of POS systems 110-130 and with kiosk 135. As each of at least self-service POS systems 110-120 can respond to instructions from POS server 145 relating to processing transactions, each can be considered an "intelligent" POS system.

POS server 145 is coupled to a visual analytics system 150, a customer database 155, an inventory management system 160, and a distributed order system 165. POS server 145 can be coupled to the visual analytics system 150, the customer preference database 155, the inventory management system 160, and the distributed order system 165 also through a network, whether wired or wireless.

Visual analytics system 150 is implemented as a data processing system. Visual analytics system is configured to analyze video and/or still images taken or recorded from one or more of POS systems 110-130 in a digital format. Customer database 155 can store customer data including historical data for customers and various other attributes and/or preferences for customers of the particular entity in which POS systems 110-130 are located. Historical data can include items previously purchased by a customer, whether the transaction was performed at a full-service POS or a self-service POS, and other information relating to the efficiency with which the customer is able to scan items during transactions.

Inventory system 160 is configured to track or maintain an accurate accounting of the inventory available for sale by the entity and include pricing information for the various items listed therein as inventory. Distributed order system 165 is an optional part of back end system 140. In one aspect, distributed order system 165 is configured to receive orders from customers via the Internet.

POS server 145, in communicating with POS systems 110-130, kiosk 135, and the various other components of back end system 140, can perform a variety of functions including, but not limited to, load balancing among POS systems 110-130, transferring transactions among different ones of POS systems 110-130, identifying customers utilizing one or more of POS systems 110-130, rewarding customers utilizing one or more of POS systems 110-130, and/or integrating with one or more kiosks 135.

The start of a transaction is defined by any of a variety of events. In one aspect, a transaction is started responsive to a customer being identified by the self-service POS system and/or the POS server. In another aspect, the start of a transaction is defined by the customer selecting an option at a self-service POS system such as "start" or "begin." The end of a transaction is indicated, or defined by, successful payment for items purchased as part of the transaction.

Figure 2:
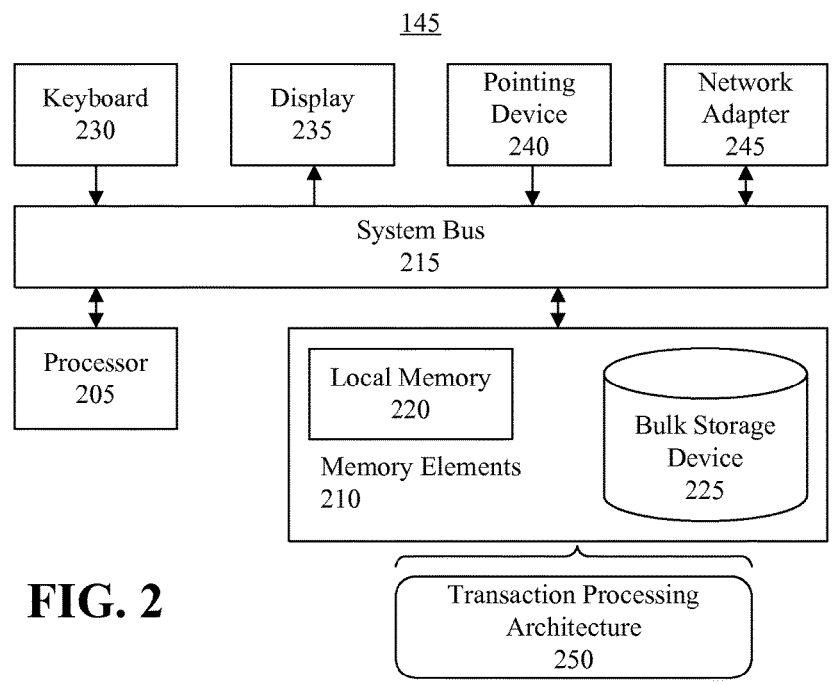
FIG. 2 is a block diagram illustrating an exemplary implementation of a point-of-sale (POS) server described with reference to FIG. 1.

FIG. 2 is a block diagram illustrating an exemplary implementation of POS server 145 of FIG. 1. For purposes of simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

POS server 145 can include at least one processor 205 coupled to memory elements 210 through a system bus 215 or other suitable circuitry. As such, POS server 145 can store program code within memory elements 210. Processor 205 can execute the program code accessed from memory elements 210 via system bus 215. In one aspect, for example, POS server 145 can be implemented as a computer that is suitable for storing and/or executing program code. It should be appreciated, however, that POS server 145 can be implemented in the form of any data processing apparatus including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as an HDD, a SSD, or other persistent data storage device. POS server 145 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to POS server 145. The I/O devices can be coupled to POS server 145 either directly or through intervening I/O controllers. One or more network adapters 245 also can be coupled to POS server 145 to enable POS server 145 to become coupled to other systems, computer systems, remote printers, remote storage devices, and/or POS systems, through intervening private or public networks. Modems, cable modems, and Ethernet cards are examples of different types of network adapters 245 that can be used with POS server 145.

As pictured in FIG. 1, memory elements 210 can store a transaction processing architecture 250. Transaction processing architecture 250, being implemented in the form of executable program code, can be executed by POS server 145 and, as such, can be considered part of POS server 145 thereby configuring POS server 145 to implement the various operations described within this specification.

As noted, FIG. 2 illustrates an exemplary implementation for POS server 145. The implementation illustrated in FIG. 2, however, also can be used to implement one or more of POS systems 110-130 and/or kiosk 135 of FIG. 1. Appreciably, when used to implement a POS system, whether self-service or full-service, the data processing apparatus can be coupled to one or more additional peripheral devices and executes different operational software suitable for a POS system to perform the functions described within this specification. As noted, examples of peripheral devices that can be included and/or coupled to a POS system can include an optical scanner, a camera, an RFID scanner, or the like. Thus, any data collected by the POS system can be transmitted to POS server 145 for processing, e.g., using suitable network adapter(s).

Figure 3:
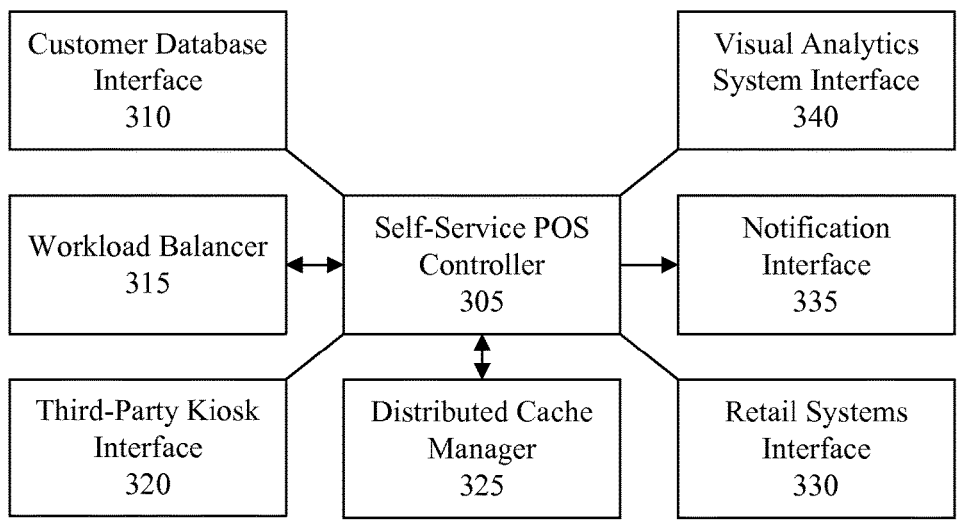
FIG. 3 is a block diagram illustrating an exemplary implementation of a transaction processing architecture described with reference to FIG. 2.

FIG. 3 is a block diagram illustrating an exemplary implementation of transaction processing architecture (architecture) 250 of FIG. 2. As shown, architecture 250, which is executed by POS server 145, includes a self-service POS controller 305, a customer database interface 310, a workload balancer 315, a third-party kiosk interface 320, a distributed cache manager 325, a retail systems interface 330, a notification interface 335, and a visual analytics system interface 340.

Self-service controller 305 is configured to perform the various decision making functions and operations described within this specification as aided by information obtained from one or more POS systems and other components of the back end system 140. Self-service controller 305 can coordinate operation of the various POS systems and the various other components of back-end system 140. Customer database interface 310 is an interface between self-service controller 305 and customer database 155 (not shown). In one aspect, customer database interface 310 is configured to send and receive information between self-service controller 305 and customer database 155.

Workload balancer 315 is configured to utilize one or more items of information to be described within this specification and determine the workload of one or more or all of the POS systems from time-to-time, upon request, periodically, or the like. In one aspect, workload balancer 315 calculates the workload for each of self-service POS system. In another aspect, workload balancer 315 calculates the workload for each full-service POS system. In still another aspect, workload balancer calculates the workload on each POS system whether a self-service POS system or a full-service POS system.

Third-party kiosk interface 320 allows self-service controller 305 to communicate with a kiosk such as kiosk 135 of FIG. 1. Using third-party kiosk interface 320, self-service POS controller 305 can receive one or more items selected for purchase by a customer at a kiosk, e.g., kiosk 135, and provide the data necessary to include the selected items in a transaction that is underway at a selected POS system.

Distributed cache manager 325 is configured to store one or more data items for one or more of the POS systems, whether self-service or full service. Data that is needed, or likely needed, by multiple ones of the POS systems can be cached within distributed cache manager 325, thereby increasing the speed of operation of the larger system. For example, more than one POS system likely accesses a subset of data, e.g., files, more frequently than other data items within a large data collection encompassing the subset of data. The frequently accessed data items can be localized, e.g., stored within or by, distributed cache manager 325. By keeping such data within memory, the number of disk reads and writes can be reduced thereby increasing the speed of POS server 145.

Retail systems interface 330 allows self-service POS controller 305 to communicate with one or more or all of POS systems 110-130, inventory management system 160, and/or distributed order system 165. Notification interface 335 allows self-service POS controller 305 to initiate the sending of a message through a messaging system to one or more communication devices carried by agents working in and around POS systems 110-130 and/or kiosk 135. For example, through notification interface 335, self-service POS controller 305 can initiate the sending of a notification via page, text message, instant message including a multimedia message, electronic mail, or the like to one or more selected communication devices.

Visual analytics system interface 340 allows self-service POS controller 305 to communicate with visual analytics system 150. Through visual analytics system interface 340, self-service POS controller 305 can provide video and/or still images of one or more customers as received from a POS system. Self-service POS controller 305 can receive, through visual analytics system interface 340, analytical information specifying the name and/or identity of a customer (or customers) within the video and/or images that were provided to the visual analytics system.

Figure 4:
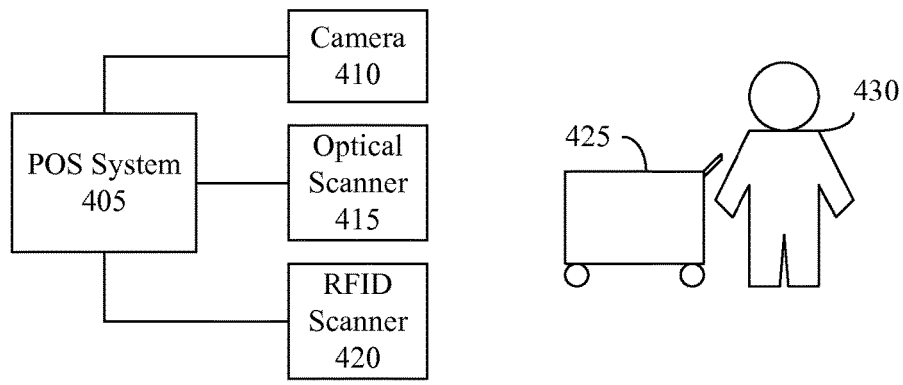
FIG. 4 is a block diagram illustrating an exemplary POS system configured for transaction processing in accordance with another embodiment disclosed within this specification.

FIG. 4 is a block diagram illustrating an exemplary POS system 405 configured for transaction processing in accordance with another embodiment disclosed within this specification. POS system 405 is an example of a POS system, whether self-service or full-service, as described with reference to FIG. 1. As noted, POS system 405 can be implemented as a data processing apparatus executing suitable operational software.

In the example presented in FIG. 4, POS system 405 is coupled to a variety of peripheral devices including a camera 410, an optical scanner 415, and an RFID scanner 420. Camera 410, optical scanner 415, and RFID scanner 420 are implemented as peripheral devices that are included within, or are coupled to, POS system 405. Thus, while illustrated separately, the peripheral devices can be considered part of POS system 405.

In operation, a customer 430 approaches POS system 405 with a cart 425. Cart 425 includes one or more items selected by customer 430 for purchase. Appreciably, customer 430 can carry one or more items for purchase and need not utilize cart 425. In any case, camera 410 captures video and/or image(s) of customer 430 as customer 430 approaches a checkout lane or aisle in which POS system 405 is located.

The visual data, e.g., the video and/or images, are sent from POS system 405 to back-end system 140 for analysis by visual analytics system 150. The visual analytics system 150 recognizes customer 430 using facial recognition technology and correlates the visual data with customer information, e.g., historical data and/or other attributes for customer 430 from the customer database.

Optical scanner 415 is configured to scan various types of optical codes, e.g., bar codes, multi-dimensional codes, or the like in order to identify items for purchase to POS system 405. POS system 405, upon scanning such an item, logs the time the item was scanned and determines pricing information from back-end system 140, e.g., from inventory system 160. Appreciably, POS server 145 can determine one or more measures of scanning efficiency for customer 430.

In one aspect, POS server 145 calculates a scan rate for the customer for the current transaction. In another aspect, the POS server determines, e.g., recalls, a scan rate for the customer from historical data that has been calculated from one or more prior transactions involving the customer at a self-service POS system. In either case, a scan rate indicates how many items are scanned by the customer per unit of time based upon the time at which each item is scanned. In one aspect, the scan rate is a general scan rate in that the scan rate is calculated from scanning multiple different types of items. Scan rate data can be stored within the historical data maintained within the customer database for customer 430 and updated using scan rate data for a current or recently completed transaction.

In another aspect, the measure of scanning efficiency is a product specific measure of scanning efficiency. In one example, the measure of scanning efficiency is a scan rate that is calculated and/or stored for one or more specific types of items. In illustration, items of a particular type such as produce may be considered more difficult to scan than other items of a different type, e.g., household goods. This difficulty can manifest itself in terms of lower scan rates across multiple customers or a lower scan rate for the product type for customer 430 specifically. Accordingly, a scan rate that is product type specific can be stored that is independent of the general scan rate previously described.

RFID scanner 420 is configured to detect RFID tags that may be placed on items potentially selected by customer 430 for purchase. RFID scanner 420, for example, can detect an RFID tag indicating that customer 430 has selected one or more items of a particular type, e.g., a flagged type of item such as produce. Detection of an RFID tag in association with an item selected for purchase can be used as an indicator that customer 430 requires assistance or that POS server 145 is to take other action.

FIG. 4 illustrates various examples of the type of data that can be collected and utilized for transaction processing. Further detail relating to the transaction processing that can be implemented is described herein with reference to the remaining flow charts which describe methods of transaction processing that utilize the various aspects of commerce system 100 described with reference to FIGS. 1-4.

Figure 5:
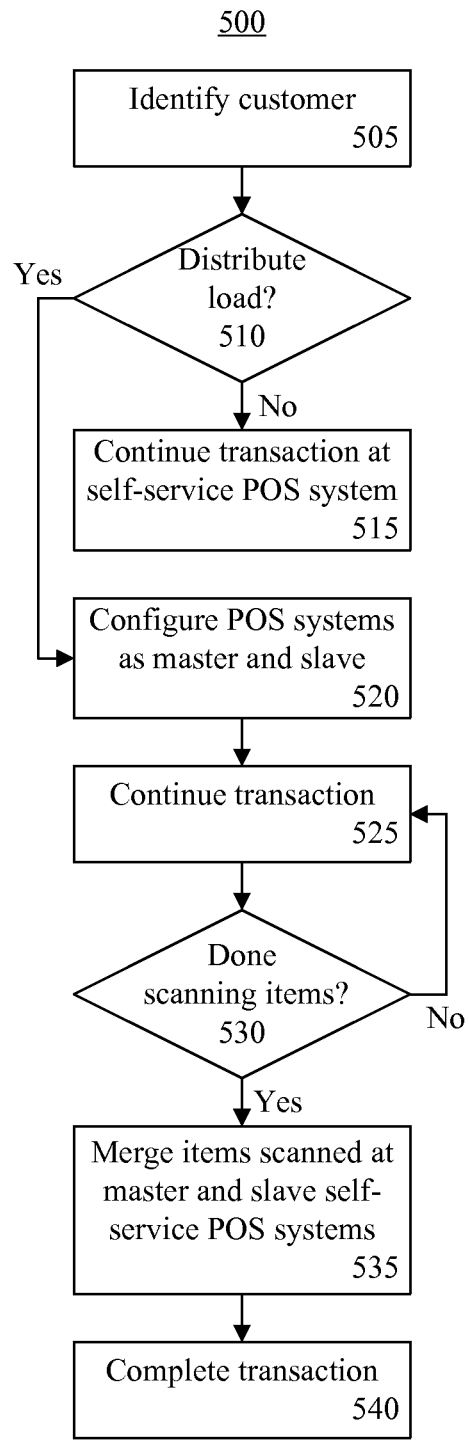
FIG. 5 is a flow chart illustrating a method of transaction processing in accordance with another embodiment disclosed within this specification.

FIG. 5 is a flow chart illustrating a method 500 of transaction processing in accordance with another embodiment disclosed within this specification. Method 500 can be performed by a commerce system and, more particularly, a POS server, as described with reference to FIGS. 1-4 of this specification.

In block 505, the POS server can identify or recognize a customer. In one aspect, the customer is identified, or recognized, by starting a transaction at a self-service POS system via the use of a customer card from which the identity of the customer can be determined. The customer can swipe or use a card such as a rewards card, an identification card, a credit card, or the like, at the self-service POS system, e.g., at the start of a transaction. One or more attributes, e.g., name, number, etc., obtained from the card can be used to locate customer information from the customer database.

In another aspect, the customer is identified through the use of image processing technology such as facial recognition technology applied to visual data collected by a self-service POS system at which the customer is about to conduct a transaction. In either case, the POS server can identify or recognize the customer by correlating the customer at the self-service POS system with customer data from the customer database thereby determining or establishing the identity of the customer.

In block 510, the POS server can determine whether to distribute the load placed upon the particular self-service POS system that is being used by the customer. In one aspect, the customer can request load distribution which allows more than one self-service POS system to be used in scanning items for a single transaction. The POS server, for example, determines whether load distribution is permitted at the time requested by the customer. If so, the POS server permits load distribution and method 500 continues to block 520. If not, the POS server prevents load distribution and method 500 proceeds to block 515, in which the transaction continues as a normal transaction being handled by a single self-service POS system.

In one aspect, the POS server determines whether load balancing is permitted according to the workload balancer. The workload balancer, for example, can determine whether any other self-service POS systems are available, the length of the line at one or more or all of the self-service POS systems, etc. In one aspect, the workload balancer can determine the length of the line according to a number of customers detected in line at each respective self-service POS system as determined by the visual analytics system using facial recognition technology.

Continuing with block 520, the POS server can configure one self-service POS system as a master and one or more other self-service POS systems as slaves. Items scanned at each of the master and slave POS systems can be aggregated at the master self-service POS system thereby allowing payment for the transaction to be received at the master self-service POS system and the transaction to be completed.

In illustration, consider the case in which a customer is utilizing a self-service POS system and the user requests that the load be distributed, e.g., the transaction be spread across two or more different self-service POS systems. The POS server determines that load distribution is allowed at the time requested, e.g., the time of the request is during a time period in which the self-service POS systems are being under-utilized as determined by the workload balancer. A neighbouring self-service POS system can be unused. The customer can use a loyalty card or the like to identify the customer to the unused self-service POS system, e.g., by swiping a card or the like at the unused self-service POS system. The POS server, being in communication with the POS systems, can determine that the customer, having requested load distribution for the current transaction during a predetermined or permitted time period, is using both self-service POS systems to perform the transaction. Accordingly, the POS server can configure, e.g., instruct, the first self-service POS system from which the load distribution request was received as a master and the second self-service POS system (e.g., the previously unused self-service POS system) as a slave. Another person accompanying the customer can scan one or more items at the slave self-service POS system while the customer scans items at the master self-service POS system.

In block 525, the transaction can continue with the customer scanning items for purchase at the master self-service POS system and another individual that is with the customer scanning one or more items at the slave self-service POS system. In block 530, the POS server can determine whether the customer (and the other individual) have finished scanning items for the current transaction. For example, either the customer or the other individual can select an option at the master or the slave self-service POS system indicating that no further items are to be scanned (or no further items are to be scanned at the slave self-service POS system) and/or that the items scanned at each respective self-service POS system are to be merged or aggregated.

In block 535, the POS server can merge the items that were scanned at the slave self-service POS system with the items that were scanned at the master self-service POS system. The POS server can instruct the master self-service POS system to add, or include, the items scanned at the slave self-service POS system to the current transaction. Accordingly, the transaction at the master self-service POS system has an updated transaction that includes all items scanned at the master self-service POS system for the customer and all items scanned at the slave self-service POS system while operating in the slave mode, e.g., a merged list of items for the current transaction.

In block 540, the transaction can be completed. Completion of the transaction is indicated by successful payment by the customer for the items included in the transaction. As noted, payment is accepted for the transaction at the master self-service POS system. In one aspect, the transaction at each of the slave self-service POS system and the mast self-service POS system can be completed upon successful payment. In another aspect, the transaction at the slave self-service POS system can be purged or cleared from the slave self-service system once the items scanned at the slave self-service POS system have been transferred (e.g., added or merged) with the items scanned at the master self-service POS system.

Figure 6:
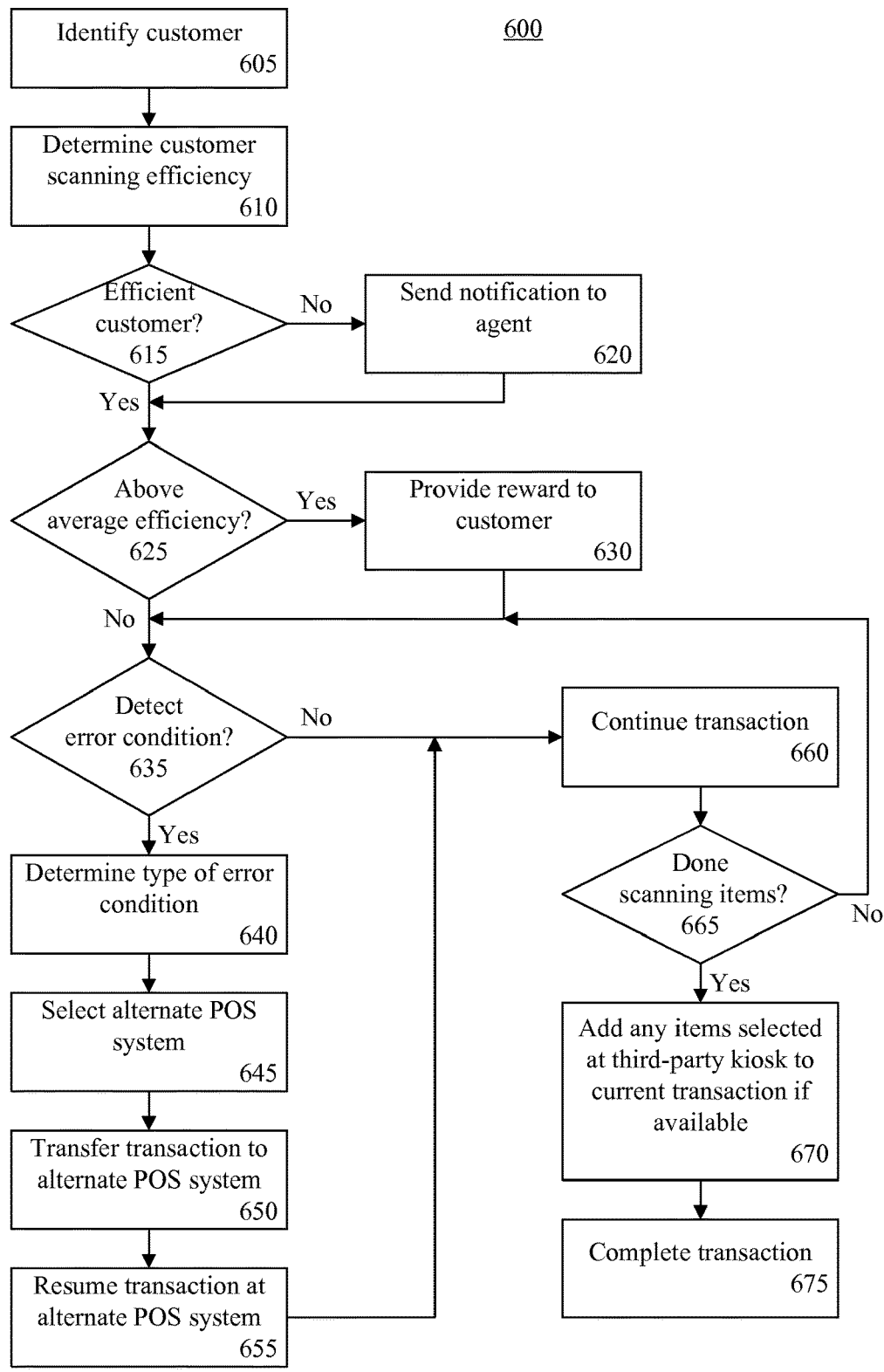
FIG. 6 is a flow chart illustrating a method of transaction processing in accordance with another embodiment disclosed within this specification.

FIG. 6 is a flow chart illustrating a method 600 of transaction processing in accordance with another embodiment disclosed within this specification. Method 600 can be performed by a commerce system and, more particularly, a POS server, as described with reference to FIGS. 1-4 of this specification.

In block 605, the POS server can identify a customer. As discussed, the customer can be identified using any of a variety of different mechanisms including, but not limited to, facial recognition technology, use of a loyalty or other identification card at the self-service POS system, or the like.

In block 610, the POS server can determine a measure of customer scanning efficiency. The POS server queries the customer database for the measure of customer scanning efficiency as specified within the historical data or other information stored for the customer identified in block 605.

In one aspect, the measure of customer scanning efficiency is a scan rate for the customer. The scan rate is a measure indicating a number of items scanned by the customer per unit of time. The scan rate can be an average, a rolling average, or the like for the customer determined over a plurality of transactions conducted at self-service POS systems. The scan rate can be one that applies across, or to, a plurality of different types of items, e.g., is general. In this regard, the scan rate is a general scan rate as opposed to a scan rate that is specific to a product or product type. The POS server can compare the scan rate of the customer with a first minimum scan rate. If the scan rate for the customer exceeds the minimum scan rate, the POS system determines that the customer is efficient. If not, the POS server determines that the customer is not efficient.

In another aspect, the measure of customer scanning efficiency can be specific to a particular product type. One or more products of a particular type can be associated with a slower than normal scan rate. As discussed, produce is one example of a product type that may be scanned at a rate that is slower than other products with more conventional packaging and a more easily locatable label having a scan code. The existence of produce, e.g., a flagged product, in the customer's cart, being held by the customer, or in another carry mechanism can be detected using image processing performed by the visual analytics system or by the scanning or detection of an RFID tag affixed to the product. In one example, the detection of a flagged product type with the customer while the customer is at or approaching a self-service POS system (e.g., prior to the start of a transaction) or during a transaction can cause the POS server to determine that the customer is not efficient.

In another example, the POS server can determine that the customer has one or more items of a particular type, e.g., flagged items, that have in the past been scanned by the customer at a scan rate that does not exceed a minimum scan rate, e.g., a product or product type specific minimum scan rate. In this case, the POS server can maintain a product (or product type) specific scan rate, e.g., for produce, for the customer that the POS server compares with a minimum product or product type specific scan rate. If the product specific scan rate for the customer does not exceed the minimum product or product type specific scan rate, the POS server determines that the customer is not efficient.

The examples described above relating to scan rates allow the POS server to recognize instances in which the user is likely to spend an increased amount of time checking out and conducting a transaction. Presuming that the customer will follow a pattern as predicted from the historical data, the customer can be provided with assistance to improve the time required for completing the transaction.

It should be appreciated that while historical scan rates have been discussed, in another aspect, the POS server can determine a scan rate for the customer for the current transaction that is in process. The scan rate for the current transaction can be compared with the minimum scan rate to determine whether the customer is efficient.

Accordingly, in block 615, the POS server determines whether the customer is efficient by comparing one or more of the measures of scanning efficiency with minimum levels of scanning efficiency. If the customer is determined to be inefficient, method 600 proceeds to block 620. If the customer is determined to be efficient, method 600 continues to block 625. Determining the efficiency of a customer as discussed above helps to alleviate, e.g., reduce or speed up, wait times and the length of check-out lines, thereby increasing customer satisfaction.

Responsive to determining that the customer is not efficient, the POS server can send, or initiate the sending of, a notification to an agent. As noted, the notification can be a text message, an instant message, an electronic mail, or the like. Other examples of notifications can include an automated telephone call, a message displayed upon an agent computer terminal, or the like. The notification can be sent to an agent that is within a predetermined distance of the customer or the self-service POS system at which the customer is located. In another aspect, the notification is sent to an agent that is tasked with monitoring the self-service POS systems. The notification can include an indication that the customer may need assistance, should be directed to a full-service POS system, or the like. The notification further can include identifying information for the customer, e.g., an image of the customer, the name of the customer, or the like. The notification further can include a reason why the customer was determined to be inefficient so the agent may better assist the customer.

In block 625, the POS server can determine whether the customer has above average scanning efficiency. The POS server can compare the scan rate, e.g., the general scan rate, for the customer with a second minimum scan rate. The second minimum scan rate is higher than the first minimum scan rate or the other minimum scan rates that are used to determine whether the customer is inefficient at scanning. If the scan rate for the customer, whether a historical scan rate or a scan rate for the current transaction, is equal to or exceeds the second minimum scan rate, method 600 proceeds to block 630. If not, method 600 continues to block 635. In block 630, the POS server can provide a reward to the customer. A reward is a monetary benefit for the customer. For example, a reward can be a discount to the customer for the current transaction, application of points or other monetary award to a loyalty program or account for the customer, or the like.

In block 635, the POS server can determine whether an error condition is detected. If an error condition is detected, method 600 proceeds to block 640. If not, method 600 continues to block 660. In one aspect, the self-service POS system is configured to detect error conditions. In another aspect, the POS server is configured to detect error conditions based upon data received from the self-service POS systems and/or other components of the back-end system.

In block 640, the POS server can determine the type of error condition that is detected. One exemplary type of error condition is a payment error condition. A payment error condition refers to the situation in which the customer attempts to use a form of payment that is not accepted by the self-service POS system. For example, accepting cash or check typically requires manual intervention by an agent. These two forms of payment typically are not accepted at self-service POS systems. In another example, a payment error condition can result in the customer attempting to use a credit or other type of card not accepted at the self-service POS system, which may or may not be accepted at another full-service POS system. Any attempt to use a form of payment not accepted by a self-service POS system results in, or generates, a payment error condition.

Another example of an error condition is a time-out error condition. A time-out error condition refers to the detection of a minimum amount of time during which no activity, e.g., no input, is received from the customer. Activity at the self-service POS system refers to any user input or user action such as scanning an item, attempting to provide payment, providing a response, etc. Another type of error condition is a malfunction error condition. A malfunction error condition refers to any type of error occurring within the self-service POS system itself. A malfunction error condition can be a malfunction of hardware and/or software of the self-service POS system. Examples can include, but are not limited to, running out of paper to print receipts, a paper jam, a scanner that is not working properly, a software error, or the like.

In one aspect, the POS server addresses error conditions, or selected error conditions, by transferring the transaction to a different POS system. This aspect is described in further detail in FIG. 6. It should be appreciated, however, that in another embodiment, the POS server sends a notification to an agent indicating that the customer at the self-service POS system, e.g., indicating the particular self-service POS system, is in need of assistance responsive to the error condition.

Continuing with FIG. 6, in block 645, the POS server selects an alternate POS system. In one aspect, the alternate POS system selected by the POS server is determined or selected based upon the particular type of error condition that is detected. In the case of a form of payment error condition, the POS server can select a POS system that does accept the form of payment that the customer attempted to use and that was not accepted by the current self-service POS system at which the transaction is taking place and the error condition originated. The POS system that is selected by the POS server can be a self-service POS system that accepts the form of payment or a full-service POS system that accepts the form of payment. In another aspect, the POS server selects a self-service POS system over a full-service POS system presuming both a self-service POS system and a full-service POS system are available, e.g., not currently engaged in a transaction. In one aspect, any self-service POS system that is selected as an alternate is one that is available, e.g., not currently engaged in a transaction with a customer, one that is not experiencing a malfunction error condition, and one that has no customers in line or queue waiting to use the POS system.

In block 650, the POS server transfers the transaction that is currently in progress from the self-service POS system used by the customer to the POS system that is selected in block 645. In one aspect, the transaction is transferred to the POS system selected in block 645 without any human intervention. In block 655, the transaction can resume at the POS system selected in block 645.

For example, the POS server obtains the current transaction from the self-service POS system at which the error condition originated and stores the current transaction, at least temporarily. The POS server instructs the self-service POS system at which the error condition originated to delete or clear the current transaction. The POS server sends the information relating to the transaction, e.g., customer data, items scanned so far, etc., to the selected POS system. Once the customer moves to the alternate POS system, the customer can select an option or provide another input indicating that the customer is ready to continue the transaction at the point or state within the transaction prior to the error condition being detected. Accordingly, in block 660, the transaction can continue.

In block 665, the POS server determines whether there are any further items to be scanned. For example, the POS server can determine whether the user has selected a payment option at the self-service POS system being used. If so, method 600 can proceed to block 670. If not, method 600 can loop back to block 635 to continue the transaction.

In block 670, the POS server can add any items that were selected for purchase by the customer at a third-party kiosk that is located on-premises with the POS systems to the current transaction. As discussed, the POS server can integrate with a third-party kiosk. In one aspect, the POS server queries the third-party kiosk as to whether the third-party kiosk has any items selected for purchase by the customer. In another aspect, the third-party kiosk reports items selected for purchase by the customer to the POS server. In that case, the POS server checks whether any items have been reported for the customer from the third-party kiosk. Any items selected for purchase by the customer at the third-party kiosk are added to the transaction.

In block 675, the transaction is completed. The customer, for example, provides payment to the POS system thereby completing the transaction.

The one or more embodiments disclosed within this specification provide a commerce system that utilizes intelligent self-service POS system to provide customers with an enhanced shopping experience. Transactions can be transferred among different POS systems responsive to detected error conditions. Further, customer scanning efficiency can be monitored to detect likely delays at self-service POS systems and further to reward customers with scanning efficiency that is above average or above a particular level of efficiency.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A point-of-sale system for efficient self-service and full-service transactions, the system comprising:
    a self-service point-of-sale terminal comprising:
        a camera configured to image a customer in a checkout lane in which the self-service point-of-sale terminal is located;
        an optical scanner configured to read identification information associated with items that the customer purchases;
        a network adapter that is communicatively connected to the camera and the optical scanner via, at least in part, a terminal bus and that is configured to transmit data obtained via the camera and optical scanner over a network;
    a point-of-sale server comprising:
        a network adapter that is communicatively connected to the network adapter of the self-service point-of-sale terminal via the network;
        a data storage device that is configured to store data that is associated with the customer and that is communicatively connected to the network adapter of the point-of-sale server via a server bus;
        a computer processor that is communicatively connected to the network adapter of the point-of-sale server and the data storage device via the server bus, wherein the computer processor is configured to:
            identify the customer using, at least in part, facial-recognition instructions and data stored on the data storage device;
            determine a scan rate of the customer based, at least in part, on data obtained from the optical scanner of the self-service point-of-sale terminal;
            retrieve data from the data storage device, wherein the data represents, at least in part, a minimum scan rate; and
            compare the scan rate of the customer to the minimum scan rate, wherein the network adapter of the point-of-sale server is configured to send a notification in response to the computer processor determining that the scan rate of the customer does not exceed the minimum scan rate;
    a full-service point-of-sale terminal that comprises a network adapter that is communicatively connected to the network adapter of the point-of-sale server; and
    an electronic device that is carried by an agent and that is communicatively connected to the network adapter of the point-of-sale server via the network, wherein the electronic device includes a notification interface that is configured to:
        receive the notification from the point-of-sale server;
        present an image of the customer based on data included in the notification; and
        present an indication that the customer should be directed to the full-service point-of-sale terminal.

2. The point-of-sale system of claim 1, wherein the self-service point-of-sale terminal further comprises a card-reader that is communicatively connected to the network adapter of the self-service point-of-sale terminal via, at least in part, the terminal bus.

3. The point-of-sale system of claim 1, wherein:
    the self-service point-of-sale terminal further comprises a radio-frequency identifier scanner that is configured to identify one or more flagged items of the items that the customer purchases; and
    the computer processor of the point-of-sale server is configured to determine that the customer is inefficient in response to receiving an indication that the radio-frequency identifier scanner has identified the one or more flagged items.

4. The point-of-sale system of claim 1, further comprising:
    a third-party kiosk that is communicatively connected to the network adapter of the point-of-sale server via the network, and wherein the computer processors of the point-of-sale server is configured to determine whether or not the customer has selected one or more items for purchase at the third-party kiosk.

5. The point-of-sale system of claim 1, further comprising:
    a distributed order system that is communicatively connected to the network adapter of point-of-sale server via the network and that is configured to receiver orders from customers via an external network.

6. The point-of-sale system of claim 1, further comprising:
    an inventory management system that is communicatively connected to the network adapter of point-of-sale server via the network.

7. The point-of-sale system of claim 1, wherein the self-service point-of-sale terminal is one of a plurality of self-service point-of-sale terminals and the full-services point-of-sale terminal is one of a plurality of full-service point-of-sale terminals, the point-of-sale system further comprising:
    a workload balancer that is communicatively connected to the network adapter of the point-of-sale server and that is configured to calculated the workload of each self-service point-of-sale terminal and each full-service point-of-sale terminal.

8. A point-of-sale system for efficient self-service and full-service transactions, the system comprising:
a self-service point-of-sale terminal comprising:
a camera configured to image a customer in a checkout lane in which the self-service point-of-sale terminal is located;
an optical scanner configured to read identification information associated with items that the customer purchases;
a network adapter that is communicatively connected to the camera and the optical scanner via, at least in part, a terminal bus and that is configured to transmit data obtained via the camera and optical scanner over a network;
a point-of-sale server comprising:
a network adapter that is communicatively connected to the network adapter of
the self-service point-of-sale terminal via the network;
a data storage device that is configured to store data that is associated with the customer and that is communicatively connected to the network adapter of the point-of-sale server via a server bus;
a computer processor that is communicatively connected to the network adapter of the point-of-sale server and the data storage device via the server bus, wherein the computer processor is configured to:
identify the customer using, at least in part, facial-recognition instructions and data stored on the data storage device;
determine a scan rate of the customer based, at least in part, on data obtained from the optical scanner of the self-service point-of-sale terminal;
retrieve data from the data storage device, wherein the data represents, at least in part, a minimum scan rate; and
compare the scan rate of the customer to the minimum scan rate, wherein the network adapter of the point-of-sale server is configured to send a notification in response to the computer processor determining that the scan rate of the customer does not exceed the minimum scan rate;
a full-service point-of-sale terminal that comprises a network adapter that is communicatively connected to the network adapter of the point-of-sale server; and
a computer terminal that is monitored by an agent and that is communicatively connected to the network adapter of the point-of-sale server via the network, wherein the computer terminal includes a notification interface that is configured to:
receive the notification from the point-of-sale server;
present an image of the customer based on data included in the notification; and
present an indication that the customer should be directed to the full-service point-of-sale terminal.

9. The point-of-sale system of claim 8, wherein the self-service point-of-sale terminal further comprises a card-reader that is communicatively connected to the network adapter of the self-service point-of-sale terminal via, at least in part, the terminal bus.

10. The point-of-sale system of claim 8, wherein:
the self-service point-of-sale terminal further comprises a radio-frequency identifier scanner that is configured to identify one or more flagged items of the items that the customer purchases; and
the computer processor of the point-of-sale server is configured to determine that the customer is inefficient in response to receiving an indication that the radio-frequency identifier scanner has identified the one or more flagged items.

11. The point-of-sale system of claim 8, further comprising:
a third-party kiosk that is communicatively connected to the network adapter of the point-of-sale server via the network, and wherein the computer processors of the point-of-sale server is configured to determine whether or not the customer has selected one or more items for purchase at the third-party kiosk.

12. The point-of-sale system of claim 8, further comprising:
a distributed order system that is communicatively connected to the network adapter of point-of-sale server via the network and that is configured to receiver orders from customers via an external network.

13. The point-of-sale system of claim 8, further comprising:
an inventory management system that is communicatively connected to the network adapter of point-of-sale server via the network.

14. The point-of-sale system of claim 8, wherein the self-service point-of-sale terminal is one of a plurality of self-service point-of-sale terminals and the full-services point-of-sale terminal is one of a plurality of full-service point-of-sale terminals, the point-of-sale system further comprising:
a workload balancer that is communicatively connected to the network adapter of the point-of-sale server and that is configured to calculated the workload of each self-service point-of-sale terminal and each full-service point-of-sale terminal.

15. A point-of-sale system for efficient self-service and full-service transactions, the system comprising:
a self-service point-of-sale terminal that is one of a plurality of self-service point-of-sale terminals, the self-service point-of-sale terminal comprising:
a card reader configured to read data from an identification card of a customer in a checkout lane in which the self-service point-of-sale terminal is located;
an optical scanner configured to read identification information associated with items that the customer purchases;
a network adapter that is communicatively connected to the card reader and the optical scanner via, at least in part, a terminal bus and that is configured to transmit data obtained via the card reader and optical scanner over a network;
a point-of-sale server comprising:
a network adapter that is communicatively connected to the network adapter of the self-service point-of-sale terminal via the network;
a data storage device that is configured to store data, including visual data captured via one or more cameras, that is associated with the customer, wherein the data storage device is communicatively connected to the network adapter of the point-of-sale server via a server bus;
a computer processor that is communicatively connected to the network adapter of the point-of-sale server and the data storage device via the server bus, wherein the computer processor is configured to:
identify the customer using, at least in part, the data read from the identification card of the customer and data stored on the data storage device;

determine a scan rate of the customer based, at least in part, on data obtained from the optical scanner of the self-service point-of-sale terminal;

retrieve data from the data storage device, wherein the data represents, at least in part, a minimum scan rate; and compare the scan rate of the customer to the minimum scan rate, wherein the network adapter of the point-of-sale server is configured to send a notification in response to the computer processor determining that the scan rate of the customer does not exceed the minimum scan rate;

a full-service point-of-sale terminal that is one of a plurality of full-service point-of-sale terminals, the full-service point-of-sale terminal including a network adapter that is communicatively connected to the network adapter of the point-of-sale server;

a workload balancer that is communicatively connected to the network adapter of the point-of-sale server and that is configured to calculate the workload of each self-service point-of-sale terminal and each full-service point-of-sale terminal; and an electronic device that is carried by an agent and that is communicatively connected to the network adapter of the point-of-sale server via the network, wherein the electronic device includes (i) a display and (ii) a notification interface that is configured to:

receive the notification from the point-of-sale server;

present, on the display of the electronic device, an image of the customer based on data included in the notification and, at least in part, the visual data stored on the data storage device of the point-of-sale server; and present, on the display of the electronic device, an indication that the customer should be directed to the full-service point-of-sale terminal.

16. The point-of-sale system of claim 15, wherein:

the self-service point-of-sale terminal further comprises a radio-frequency identifier scanner that is configured to identify one or more flagged items of the items that the customer purchases; and the computer processor of the point-of-sale server is configured to determine that the customer is inefficient in response to receiving an indication that the radio-frequency identifier scanner has identified the one or more flagged items.

17. The point-of-sale system of claim 15, further comprising:

a third-party kiosk that is communicatively connected to the network adapter of the point-of-sale server via the network, and wherein the computer processors of the point-of-sale server is configured to determine whether or not the customer has selected one or more items for purchase at the third-party kiosk.

18. The point-of-sale system of claim 15, further comprising:

a distributed order system that is communicatively connected to the network adapter of point-of-sale server via the network and that is configured to receiver orders from customers via an external network.

19. The point-of-sale system of claim 15, further comprising:

an inventory management system that is communicatively connected to the network adapter of point-of-sale server via the network.

* * * * *